United States Patent [19]

Bamberger et al.

[11] 4,180,555

[45] Dec. 25, 1979

[54] PROCESS FOR PRODUCING HYDROGEN FROM WATER USING COBALT AND BARIUM COMPOUNDS

[75] Inventors: Carlos E. Bamberger, Oak Ridge, Tenn.; Donald M. Richardson, deceased, late of Oak Ridge, Tenn., by Elizabeth B. Richardson, executrix

[73] Assignee: The United States of America as represented by the United States Department of Energy, Washington, D.C.

[21] Appl. No.: 934,768

[22] Filed: Aug. 17, 1978

[51] Int. Cl.² ............................. C01B 1/09; C01B 1/00
[52] U.S. Cl. ................................. 423/657; 423/594; 423/592; 423/636; 423/507; 423/481; 423/579
[58] Field of Search .................... 423/657, 594, 648 R

[56] References Cited

U.S. PATENT DOCUMENTS

| | | | |
|---|---|---|---|
| 3,919,406 | 11/1975 | Grimes et al. | 423/648 |
| 3,927,192 | 12/1975 | Bamberger et al. | 423/657 |
| 3,929,979 | 12/1975 | Bamberger et al. | 423/648 |
| 3,996,343 | 12/1976 | Bamberger et al. | 423/657 |
| 4,005,184 | 1/1977 | Bamberger et al. | 423/657 |
| 4,064,226 | 12/1977 | Becker et al. | 423/657 |

OTHER PUBLICATIONS

Strauss et al., "Journal of American Chem. Soc.,", vol. 73, 1951, pp. 5084–5086.
Yao, "Journal of Catalysis", vol. 36, 1975, pp. 266–275.
Negas et al., "Chemical Abstracts", vol. 77, 1972, #144866z.
Candela et al., "Chemical Abstracts", vol. 79, 1973, #98518d.

Primary Examiner—Herbert T. Carter
Attorney, Agent, or Firm—R. V. Lupo; Stephen D. Hamel

[57] ABSTRACT

A thermochemical process for producing hydrogen comprises the step of reacting CoO with BaO or Ba(OH)$_2$ in the presence of steam to produce H$_2$ and novel double oxides of Ba and Co having the empirical formulas BaCoO$_{2.33}$ and Ba$_2$CoO$_{3.33}$. The double oxide can be reacted with H$_2$O to form Co$_3$O$_4$ and Ba(OH)$_2$ which can be recycled to the original reaction. The Co$_3$O$_4$ is converted to CoO by either of two procedures. In one embodiment Co$_3$O$_4$ is heated, preferably in steam, to form CoO. In another embodiment Co$_3$O$_4$ is reacted with aqueous HCl solution to produce CoCl$_2$ and Cl$_2$. The CoCl$_2$ is reacted with H$_2$O to form CoO and HCl and the CoO is recycled to the initial reaction step. The Cl$_2$ can be reacted with H$_2$O to produce HCl. HCl can be recycled for reaction with Co$_3$O$_4$.

8 Claims, 1 Drawing Figure

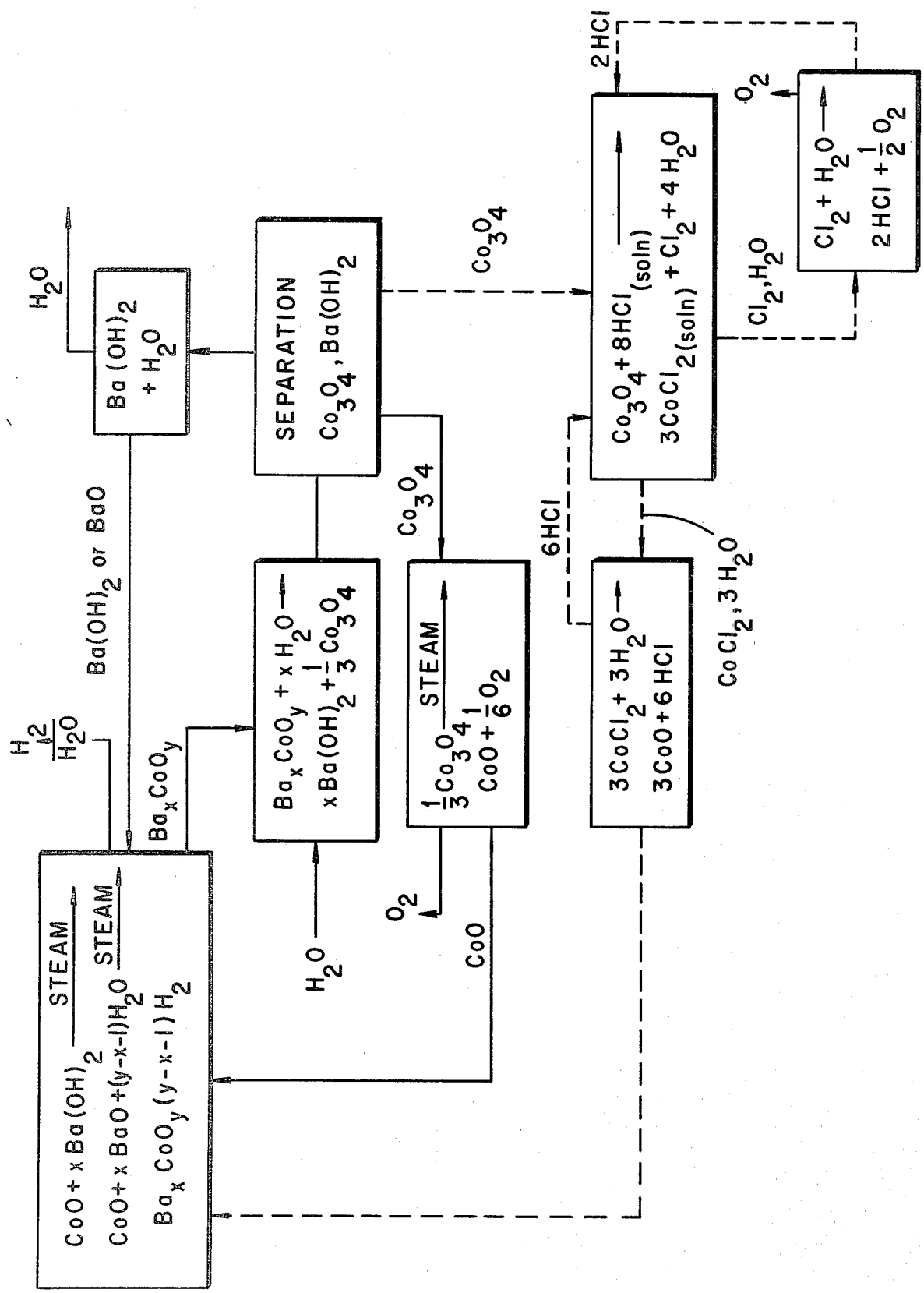

PROCESS FOR PRODUCING HYDROGEN FROM WATER USING COBALT AND BARIUM COMPOUNDS

BACKGROUND OF THE INVENTION

This invention was made in the course of, or under, a contract with the United States Department of Energy.

It relates in general to the art of thermochemical hydrogen production. Thermochemical processes present the most attractive means for producing hydrogen. By this technique water is broken down into hydrogen and oxygen through a series of chemical reactions which do not involve the use of fossil fuels. Preferably, a series of reactions is carried out in a closed cyclic manner so that all products except hydrogen and oxygen are reused as reactants in other reactions, and the only reactant which must be added is water. A number of processes have been described in the prior art, for example, commonly assigned U.S. Pat. Nos. 3,490,871 and 4,005,184.

The chief considerations in thermochemical hydrogen production processes are the maximum heat required to drive the reaction, the ease of separation of the products, and the kinetics of the reactions. Since the inputs to the processes are thermal energy and water, the lower the reaction temperature, the lower is the cost of the product. The faster the kinetics of the reactions, the larger is the throughput through a plant, and consequently, the lower the investment required per unit of output.

SUMMARY OF THE INVENTION

It is an object of this invention to provide a novel method for producing hydrogen utilizing barium and cobalt compounds.

It is a further object to provide novel compositions of matter comprising barium-cobalt double oxides useful as intermediates in the process.

It is a further object to provide a process for producing hydrogen which can be carried out in a closed manner such that the only inputs to the process are water and thermal energy.

It is a further object to provide a closed process wherein all reactions can proceed below about 950° C.

These and other objects are provided according to this invention in a process for producing hydrogen comprising the step of (a) reacting CoO with BaO or Ba(OH)$_2$ in the presence of steam to produce H$_2$ and a double oxide of Ba and Co. The double oxide can be reacted with H$_2$O to form Co$_3$O$_4$ and Ba(OH)$_2$ which can be recycled to the original reaction. If desired, Ba(OH)$_2$ can be heated to decompose it to BaO for recycle. The Co$_3$O$_4$ is converted to CoO by either of two procedures. In one embodiment Co$_3$O$_4$ is heated, preferably in steam, to form CoO. In another embodiment Co$_3$O$_4$ is reacted with aqueous HCl solution to produce CoCl$_2$ and Cl$_2$. The CoCl$_2$ is reacted with H$_2$O to form CoO and HCl and the CoO is recycled to the initial reaction step. The Cl$_2$ can be reacted with H$_2$O to produce HCl. HCl can be recycled for reaction with Co$_3$O$_4$.

In its composition aspects, this invention comprises a double oxide of Ba and Co prepared by reacting CoO with BaO or Ba(OH)$_2$ in the presence of steam. When Ba(OH)$_2$ or BaO react with CoO in a Ba/Co mole ratio of 1 or less, a double oxide having the empirical formula BaCoO$_{2.33}$ is produced. When Ba(OH)$_2$ or BaO react with CoO in a Ba/Co mole ratio of 2 or more, a double oxide having the formula Ba$_2$CoO$_{3.33}$ results. With Ba/Co ratios between 1 and 2, a mixture of the double oxides results. Regardless of the stoichiometry the double oxides are useful as intermediates in the process because they are hydrolyzable to Co$_3$O$_4$.

BRIEF DESCRIPTION OF THE DRAWING

The single FIGURE of drawing is a flow chart illustrating two alternate embodiments for the cyclic production of hydrogen.

DETAILED DESCRIPTION

In accordance with this invention it has been found that the reaction of CoO with Ba(OH)$_2$ or BaO in the presence of steam produces useful Ba, Co double oxides which can be chemically treated in a series of reactions, none of which requires temperatures above about 950° C., to regenerate Ba(OH)$_2$ and CoO for recycle to the initial reaction. The series of reactions requires the addition of no materials other than H$_2$O. The thermochemical cycles of this invention are summarized by the reactions below:

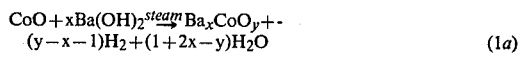
$$CoO + xBa(OH)_2 \xrightarrow{steam} Ba_xCoO_y + (y-x-1)H_2 + (1+2x-y)H_2O \quad (1a)$$

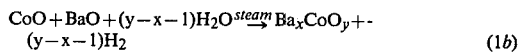
$$CoO + BaO + (y-x-1)H_2O \xrightarrow{steam} Ba_xCoO_y + (y-x-1)H_2 \quad (1b)$$

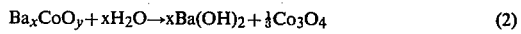
$$Ba_xCoO_y + xH_2O \rightarrow xBa(OH)_2 + \tfrac{1}{3}Co_3O_4 \quad (2)$$

$$\tfrac{1}{3}Co_3O_4 \rightarrow CoO + 1/6 O_2 \quad (3)$$

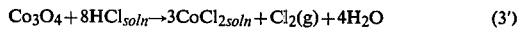
$$Co_3O_4 + 8HCl_{soln} \rightarrow 3CoCl_{2\,soln} + Cl_2(g) + 4H_2O \quad (3')$$

$$3CoCl_2 + 3H_2O(g) \rightarrow 3CoO + 6HCl(g) \quad (4')$$

$$Cl_2 + H_2O \rightarrow 2HCl + \tfrac{1}{2}O_2 \quad (5')$$

The cyclic production of hydrogen is illustrated in the single FIGURE of drawing. In the initial step, CoO is reacted with Ba(OH)$_2$ (1a) or BaO (1b) in the presence of steam (e.g. at 1 atm.). The reaction should be conducted in equipment resistant to Ba(OH)$_2$ corrosion. The reaction proceeds at temperatures above about 500° C. with maximum H$_2$ production occurring in the range of about 720°–820° C. and with 800° C. preferred. The presence of steam is essential to both reations (1a) and (1b), since it indirectly provides the oxidation power to increase the valence of cobalt. Steam also prevents the dehydration of Ba(OH)$_2$. When BaO is employed as a reactant, steam in excess of that required for reaction (1b) must be used, since the Ba(OH)$_2$-CoO-steam system is essentially equivalent to the BaO-CoO-steam system. Without Ba(OH)$_2$ or BaO, CoO is not oxidized by steam, because the presence of the barium compounds enables the formation of a stable Co(III) containing product. No hydrogen is produced when Co$_3$O$_4$ or Co$_2$O$_3$ are reacted with Ba(OH)$_2$ in the presence of steam. Reactions (1a) or (1b) can be easily performed by heating particulate BaO or Ba(OH)$_2$ in contact with CoO in the presence of steam. Since Ba(OH)$_2$ melts at about 400° C., the reaction occurs between liquid Ba(OH)$_2$ and solid CoO. The efficiency of the reaction is somewhat dependent upon the particle size of CoO, with smaller particles providing more efficient Co utilization. The stoichiometry of the reaction of CoO with Ba(OH)$_2$ or with BaO and H$_2$O depends upon the Ba/Co mole ratio in the reaction mixture, as illustrated by the reactions (6) and (7).

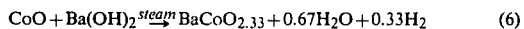  (6)

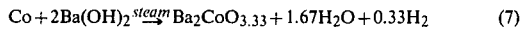  (7)

When the Ba/Co mole ratio is 1 or less, the $BaCoO_{2.33}$ product results. When the Ba/Co mole ratio is 2 or more, the $Ba_2CoO_{3.33}$ product results. At Ba/Co mole ratios between 1 and 2, a mixture of the compositions results, represented by $Ba_xCoO_y$ where $2 \geq x \geq 1$ and $2.33 \leq x \leq 3.33$. Other Ba, Co double oxides as yet unidentified in the products of reaction (1a) or (1b) are contemplated as equivalents to the $Ba_2Co_{3.33}$ and $BaCoO_{2.33}$ compositions. The Ba/Co mole ratio in the reaction mixture should be at least 1, with 1.8–2.2 resulting in maximum $H_2$ production. The preferred Ba/Co mole ration is about 2.

The products of reactions (1a) or (1b) are $H_2$ and $H_2O$ vapor and novel double oxides of Ba and Co. Chemical analysis indicates that the maximum average oxidation state of Co in the compounds is +2.67 (the same oxidation state as in $Co_3O_4$). X-ray diffraction patterns of the compounds were different from those reported for the Ba-Co-O systems. It appeared that the $BaCoO_{2.33}$ composition had a "perovskite" structure. Reactions (1a) and (1b) proceed essentially to completion. $H_2$ can be separated by condensing out the water vapor. For some applications $H_2$ need not be separated, for example in the production of $H_2$-rich gas for use in coal conversion processes. If the reactions are not carried to completion, unreacted CoO and $Ba(OH)_2$ need not be separated since subsequent steps in the cycle will enable their recovery and recycle.

Reaction (2) is performed by reacting the $Ba_xCoO_y$ product with water at about 80°–100° C. The reaction products are $Ba(OH)_2$, which is partially soluble in water, and $Co_3O_4$. The reaction stoichiometries for reaction (2) depend upon the $Ba_xCoO_y$ product of reactions (1a) or (1b) and are represented by reactions (8) and (9):

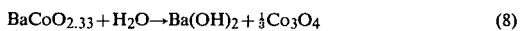  (8)

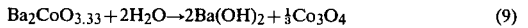  (9)

Reaction (2) can be easily carried out by repeated boiling and filtration of the solid product of reaction (1a) or (1b) at atmospheric pressure. An inert atmosphere, e.g. Ar or $N_2$, should be used to avoid the formation of $BaCO_3$ from $CO_2$ present in air. In the laboratory this reaction can be carried out in a Soxhlet extractor in a conventional manner by boiling water from a reservoir and condensing steam onto the powdered mixed oxide. When the Soxhlet is full the liquid is siphoned back to the reservoir to begin a second cycle. The $Ba(OH)_2$ remains in the reservoir for use in Reaction 1. In the laboratory about 12 hours are required for the reaction to go to completion. The products of this reaction are partially soluble $Ba(OH)_2$ which remains in the reservoir, and solid $Co_3O_4$. On a plant scale the $Ba(OH)_2$ solution is separated from $Co_3O_4$ and does not interfere with subsequent steps in the cycle. The $Ba(OH)_2$ solution is evaporated and the dry $Ba(OH)_2$ is recycled to reaction (1a). If desired, further heating, e.g. to 900° C., converts $Ba(OH)_2$ to BaO, which is recycled to reaction (1b). The $Co_3O_4$ is then decomposed to provide $O_2$ and CoO for recycle to the initial reaction step.

In one embodiment the $Co_3O_4$ is heated to a temperature of 800 to 1000° C. to thermally decompose the material into CoO and oxygen according to reaction (3). This decomposition can be carried out by heating either under vacuum, inert atmosphere, or steam. With a steam atmosphere, a temperature in the range of 800 to 880° C. is sufficient to carry out the decomposition, whereas with an inert atmosphere a temperature of 950° to 1050° C. is needed. Additionally, a steam atmosphere has been found to provide a smaller particle size CoO product, which is beneficial for use in the initial reactions (1a) and (1b). Oxygen is recovered from the gas phase by condensation of water vapor. The decomposition of $Co_3O_4$ proceeds to completion and the solid CoO is recycled to the initial reaction step.

An alternative procedure for generating CoO from $Co_3O_4$ (indicated on the figure by dashed lines) is by the reaction of $Co_3O_4$ with hydrochloric acid in aqueous solution (6 to 12 M, preferably 11 M) at 25° to 50° C. to provide $Cl_2$, $H_2O$, and $CoCl_2$ according to reaction (3'). Solid $CoCl_2$ is recovered from the resulting aqueous solution by evaporating the water. The solid $CoCl_2$ is reacted with steam by passing the steam over or through the $CoCl_2$ at about 750°–850° C., preferably 800° C. to provide CoO and HCl(g) according to reaction (4'). The HCl s carried out with the excess steam and can be condensed to provide an HCl solution which is adjusted to the appropriate HCl concentration for reaction (3'). $Cl_2$ is recovered from the gaseous product of reaction (3') and reacted with $H_2O$ according to the well-known reverse Deacon reaction by passage of a $Cl_2/H_2O$ mixture through a heated reaction chamber at a temperature of 600°–900° C. to produce HCl and $O_2$ according to reaction (5'). An activated carbon catalyst can be used if desired. The HCl can be recovered and the resulting HCl solution can be adjusted to provide the appropriate concentration for use in reaction (3').

It will be apparent to those skilled in the art that water need not be quantitatively recycled in the processes of this invention but can be economically added wherever required.

The following examples describe laboratory procedures for carrying out key reactions of the cycle. It is well within the skill of the art to scale up the reactions to plant scale.

EXAMPLE I

CoO and $Ba(OH)_2$ powders were mixed by grinding and loaded into platinum or gold boats to be placed in silica tubes in a horizontal tube furnace. The temperature was slowly raised under an argon flow. Steam was introduced at a temperature range of about 500° C. The exiting gases (Ar, $H_2O$, and $H_2$) were passed through a condenser, a column of drying agents and a thermal conductivity cell calibrated for hydrogen and argon. Hydrogen was detected beginning at about 500°±20° C. and reached a maximum concentration in the range of 720°–820° C. The inert gas was not necessary for the reaction, but was present to facilitate $H_2$ analysis.

The molar ratio of barium to cobalt was varied between 0.5–3.9 to determine the value of x in the $Ba_xCoO_y$ product and to study the effect of the ratio on hydrogen production. It was found that barium/cobalt ratio of about 2 is desirable to maximize $H_2$ production efficiency. Ba/Co ratios lower than 1 do not enable all the cobalt to participate in the reaction. With Ba/Co equal to 2.29 in a static system, i.e. no mechanical stirring, 70% of the hydrogen was evolved in four hours while the temperature was varied from ambient to 1100°C. A subsequent 4-hour period at 1100° C. released the remaining 30% of the hydrogen. Novel $Ba_x$-$CoO_y$ compounds were produced by these reactions and remained in the boats as solids. The compounds were determined by chemical analysis to have the empirical formulas of $BaCoO_{2.33}$ and $Ba_2CoO_{3.33}$.

EXAMPLE II

A Ba, Co double oxide prepared according to Example I was hydrolyzed by reaction with water in a Soxhlet extraction apparatus under an atmosphere of argon at about 70° C. to avoid formation of $BaCo_3$. About 7 grams of the solid Ba, Co double oxide was placed in the Soxhlet apparatus on a fritted glass surface and water in the reservoir was heated to cause evaporation and condensation onto the solid material. During exposure to hot water for about seven hours, the $Ba(OH)_2$ product dissolved and passed into the reservoir. The Soxhlet extraction yielded a pure product that was identified by x-ray diffraction as $Co_3O_4$. The kinetics appeared to indicate that the reaction is sufficiently rapid for practical applications. Only a trace of barium was found in another $Co_3O_4$ sample prepared under essentially the same conditions.

EXAMPLE III $Co_3O_4$ was decomposed under flowing argon and under a mixture of argon and steam. The oxygen evolved was measured with a Beckmann Oxygen Analyzer. In both cases the product obtained consisted essentially of CoO, its purity depending upon the purity of the initial $Co_3O_4$. The effect of the steam was to lower the temperature at which oxygen was evolved. With the argon/steam atmosphere (5 vol.% Ar at 1 atm. total pressure) 93% of the expected $O_2$ had evolved by the time the temperature reached 875° C. With an argon atmosphere the same fraction was collected by the time the temperature reached 960° C.

An aspect of this invention is the discovery of integrated chemical reaction cycles which produce $H_2$ in a high yield without difficult separation steps. The reaction conditions for the individual reations can be varied somewhat from the specific temperatures, pressures, times, etc. described herein and still provide the desired products. All that is required according to this invention is that the reactants or material containing the reactants, be reacted to produce the specified products which are then separated and/or recycled to other steps in the process, regardless of the specific conditions under which the reactions are conducted.

What is claimed is:

1. A process for producing hydrogen comprising the step of (a) reacting CoO with BaO or $Ba(OH)_2$ in the presence of steam at a temperature above about 500° C. to produce $H_2$ and a double oxide of Ba and Co.

2. The process of claim 1 in which the Ba/Co mole ratio of said step (a) is 1.8 to 2.2.

3. The process of claim 1 further comprising reacting said double oxide of Ba and Co with $H_2O$ to form $Co_3O_4$ and $Ba(OH)_2$.

4. The process of claim 3 further comprising recycling said $Ba(OH)_2$ to said step (a).

5. The process of claim 3 further comprising heating said $Co_3O_4$ to form CoO and recycling said CoO to step (a).

6. The process of claim 5 in which said $Co_3O_4$ is heated in the presence of steam.

7. The process of claim 3 further comprising
    (b) reacting said $Co_3O_4$ with aqueous HCl solution to produce $CoCl_2$ and $Cl_2$,
    (c) reacting said $CoCl_2$ with $H_2O$ to form CoO and HCl, and
    (d) recycling CoO from step (c) to step (a).

8. The process of claim 7 further comprising
    (e) reacting $Cl_2$ from step (b) with $H_2O$ to produce HCl and $O_2$
    (f) recycling HCl from steps (c) and (e) to step (b).

* * * * *